United States Patent
Guthrie et al.

(10) Patent No.: US 8,370,595 B2
(45) Date of Patent: Feb. 5, 2013

(54) AGGREGATE DATA PROCESSING SYSTEM HAVING MULTIPLE OVERLAPPING SYNTHETIC COMPUTERS

(75) Inventors: Guy L. Guthrie, Austin, TX (US); Charles F. Marino, Round Rock, TX (US); William J. Starke, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 12/643,800

(22) Filed: Dec. 21, 2009

(65) Prior Publication Data

US 2011/0153943 A1    Jun. 23, 2011

(51) Int. Cl.
*G06F 12/00* (2006.01)

(52) U.S. Cl. ........ 711/163; 711/118; 711/119; 711/120; 711/121; 711/130; 711/147; 711/148; 711/170

(58) Field of Classification Search .......... 711/118–121, 711/124, 130, 147, 148, 163, 170
See application file for complete search history.

(56) References Cited

U.S. PATENT DOCUMENTS

| | | | | |
|---|---|---|---|---|
| 5,845,071 A | * | 12/1998 | Patrick et al. ................. | 709/215 |
| 6,401,174 B1 | * | 6/2002 | Hagersten et al. ............ | 711/147 |
| 6,725,307 B1 | | 4/2004 | Alvarez, II et al. | |
| 2001/0052054 A1 | * | 12/2001 | Franke et al. ................. | 711/147 |
| 2002/0004886 A1 | * | 1/2002 | Hagersten et al. ........... | 711/141 |

OTHER PUBLICATIONS

U.S. Appl. No. 12/643,716 entitled "Aggregate Symmetric Multiprocessor System"; Final office action dated Jul. 23, 2012.
U.S. Appl. No. 12/643,716 entitled "Aggregate Symmetric Multiprocessor System"; Non-final office action dated Dec. 12, 2011.

* cited by examiner

*Primary Examiner* — Arpan P. Savla
(74) *Attorney, Agent, or Firm* — Yudell Isidore Ng Russell PLLC

(57) ABSTRACT

A first SMP computer has first and second processing units and a first system memory pool, a second SMP computer has third and fourth processing units and a second system memory pool, and a third SMP computer has at least fifth and sixth processing units and third, fourth and fifth system memory pools. The fourth system memory pool is inaccessible to the third, fourth and sixth processing units and accessible to at least the second and fifth processing units, and the fifth system memory pool is inaccessible to the first, second and sixth processing units and accessible to at least the fourth and fifth processing units. A first interconnect couples the second processing unit for load-store coherent, ordered access to the fourth system memory pool, and a second interconnect couples the fourth processing unit for load-store coherent, ordered access to the fifth system memory pool.

26 Claims, 6 Drawing Sheets

AGGREGATE DATA PROCESSING SYSTEM HAVING MULTIPLE OVERLAPPING SYNTHETIC COMPUTERS

BACKGROUND OF THE INVENTION

1. Technical Field

The present invention relates in general to data processing and, in particular, to coherent data processing systems.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of cache states stored in association with the cache lines held at each level of the cache hierarchy, as well as a set of coherency messages utilized to communicate the cache state information between cache hierarchies. In a typical implementation, the cache state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access request. The MESI protocol allows a cache line of data to be tagged with one of four states: "M" (Modified), "E" (Exclusive), "S" (Shared), or "I" (Invalid). The Modified state indicates that a memory block is valid only in the cache holding the Modified memory block and that the memory block is not consistent with system memory. When a coherency granule is indicated as Exclusive, then, of all caches at that level of the memory hierarchy, only that cache holds the memory block. The data of the Exclusive memory block is consistent with that of the corresponding location in system memory, however. If a memory block is marked as Shared in a cache directory, the memory block is resident in the associated cache and in at least one other cache at the same level of the memory hierarchy, and all of the copies of the coherency granule are consistent with system memory. Finally, the Invalid state indicates that the data and address tag associated with a coherency granule are both invalid.

The state to which each cache line is set is dependent upon both a previous state of the data within the cache line and the type of memory access request received from a requesting device (e.g., the processor). Accordingly, maintaining memory coherency in the system requires that the processors communicate messages via the system interconnect indicating their intention to read or write memory locations. For example, when a processor desires to write data to a memory location, the processor may first inform all other processing elements of its intention to write data to the memory location and receive permission from all other processing elements to carry out the write operation. The permission messages received by the requesting processor indicate that all other cached copies of the contents of the memory location have been invalidated, thereby guaranteeing that the other processors will not access their stale local data.

To provide greater processing power, system scales of SMP systems (i.e., the number of processing units in the SMP systems) have steadily increased. However, as the scale of a system increases, the coherency messaging traffic on the system interconnect also increases, but does so approximately as the square of system scale rather than merely linearly. Consequently, there is diminishing return in performance as SMP systems scales increase, as a greater percentage of interconnect bandwidth and computation is devoted to transmitting and processing coherency messages.

As system scales increase, the memory namespace shared by all processor cores in an SMP system, which is commonly referred to as the "real address space," can also become exhausted. Consequently, processor cores have insufficient addressable memory available to efficiently process their workloads, and further growth of system scale is again subject to a diminishing return in performance.

To address the challenges in scaling SMP systems, alternative multi-processor architectures have also been developed. These alternative architectures include non-uniform memory access (NUMA) architectures, which, if cache coherent, suffer the same challenges as SMP systems and if non-coherent do not satisfy the coherency requirements of many workloads. In addition, grid, network and cluster computing architectures have been developed, which utilize high latency mailbox communication between software protocol stacks to maintain coherency.

SUMMARY OF THE INVENTION

In some embodiments, an aggregate symmetric multiprocessor (SMP) data processing system includes a first SMP computer having first and second processing units and a first system memory pool, a second SMP computer having third and fourth processing units and a second system memory pool, and a third SMP computer having at least fifth and sixth processing units and third, fourth and fifth system memory pools. The fourth system memory pool is inaccessible to the third, fourth and sixth processing units and accessible to at least the second and fifth processing units, and the fifth system memory pool is inaccessible to the first, second and sixth processing units and accessible to at least the fourth and fifth processing units. A first interconnect couples the second processing unit for load-store coherent, ordered access to the fourth system memory pool, and a second interconnect couples the fourth processing unit for load-store coherent, ordered access to the fifth system memory pool.

DETAILED DESCRIPTION OF ILLUSTRATIVE EMBODIMENT

Figure 1:
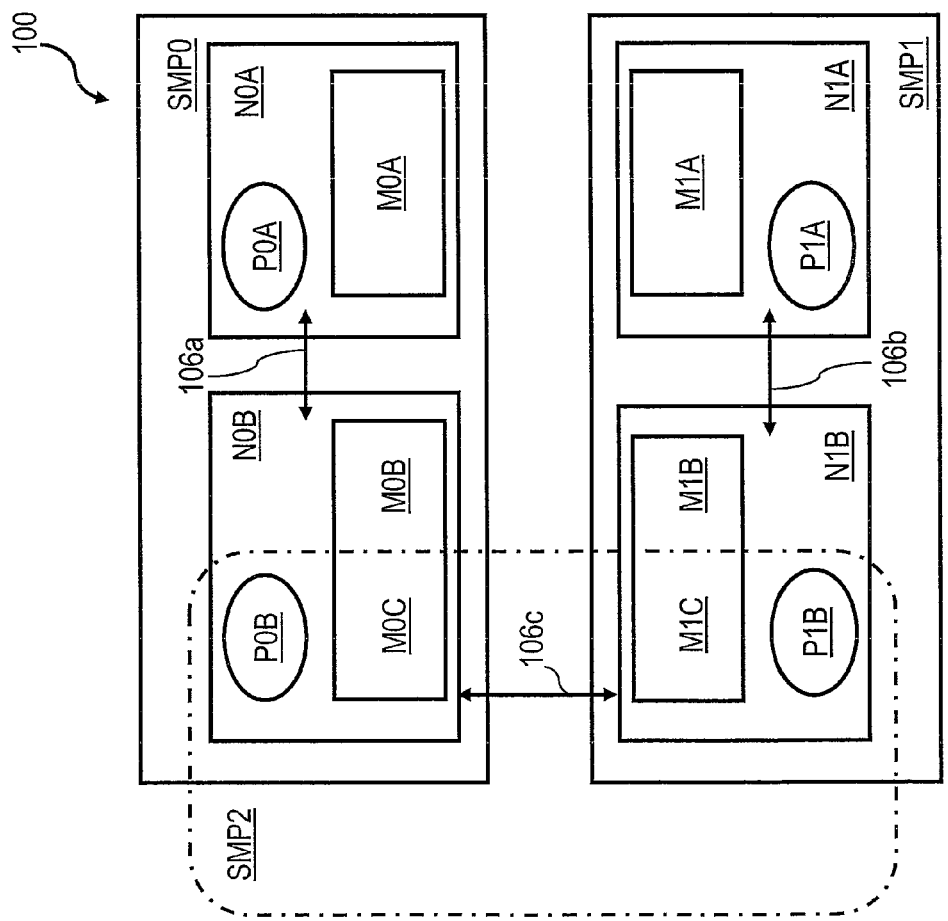
FIG. 1 is a high level block diagram of an exemplary aggregate SMP data processing system in accordance with one embodiment.

With reference now to the figures and, in particular, with reference to FIG. 1, there is illustrated a high level block diagram of an exemplary aggregate symmetric multiprocessor data processing system 100 in accordance with one embodiment. As shown, data processing system 100 includes multiple physical symmetric multiprocessor (SMP) computers SMP0, SMP1. In the depicted embodiment, SMP computers SMP0, SMP1 each contain multiple processing nodes for processing data and instructions. In FIG. 1, each such processing node is designated by a reference character "Nxx" indicating the SMP computer to which the processing unit pool belongs and a uniquely identifying alphabetic character. For example, SMP computer SMP0 includes processing nodes N0A and N0B, and SMP computer SMP1 includes processing nodes N1A and N1B. The processing nodes in each SMP computer are all coupled for communication by a respective one of SMP interconnects 106a, 106b for conveying address, data and control information. Each such SMP interconnect 106 may be implemented, for example, as a bused interconnect, a switched interconnect or a hybrid interconnect.

Each processing node, which may be realized, for example, as a multi-chip module (MCM), includes one or more processing unit pools designated in FIG. 1 by a reference character "Pyy" indicating the SMP computer and processing node to which the processing unit pool belongs. Thus, for example, processing node N0A includes processing unit pool P0A, processing node N0B includes processing unit pool P0B, processing node N1A includes processing unit pool P1A, and processing node N1B includes processing unit pool P1B.

Each processing node further includes one or more system memory pools, where each such system memory pool is designated in FIG. 1 by a reference character "Mzz" indicating the SMP computer to which the processing unit pool belongs and a uniquely identifying alphabetic character. Thus, for example, processing node N0A includes system memory pool M0A, processing node N0B includes system memory pools M0B and M0C, processing node N1A includes system memory pool M1A, and processing node N1B includes system memory pools M1B and M1C.

Figure 2:
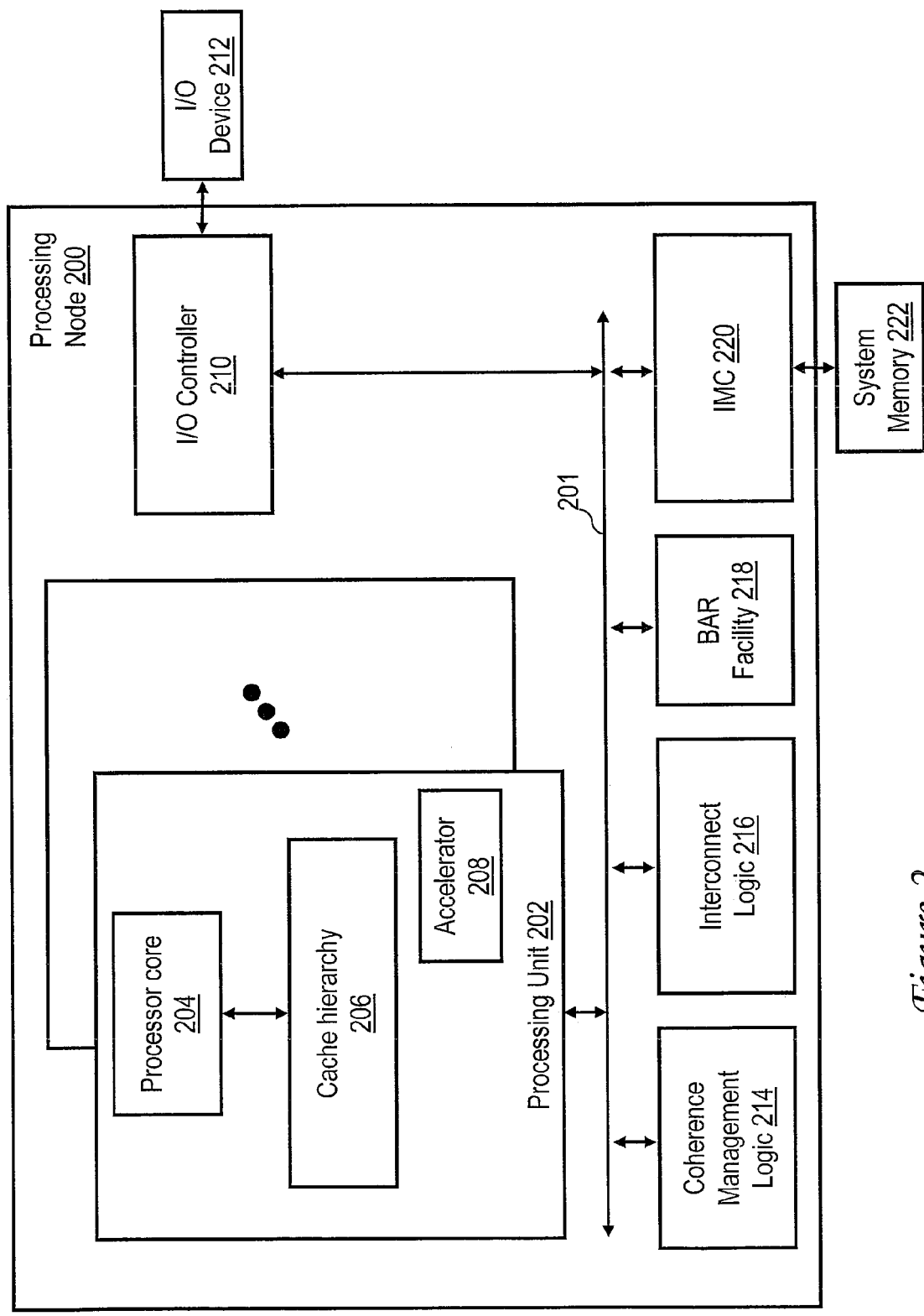
FIG. 2 is a high level block diagram of a processing unit from FIG. 1.

Referring now to FIG. 2, there is depicted a more detailed block diagram of an exemplary processing node 200 of aggregate data processing system 100 of FIG. 1 in accordance with one embodiment. In the depicted embodiment, the processing unit pool of processing node 200 includes one or more processing units 202 each including a processor core 204 and associated cache hierarchy 206. As shown, the processing unit pool may optionally further include one or more hardware accelerators 208, as well as an I/O (input/output) controller 210 supporting the attachment of one or more I/O devices, such as I/O device 212. FIG. 2 also illustrates that the system memory pool of processing node 200 includes one or more system memories 222 and one or more integrated memory controllers (IMCs) 210 that control read and write access to system memories 222.

The processing unit pool(s) and system memory pool(s) within processing node 200 are coupled to each other for communication by a local interconnect 201, which, like SMP interconnects 106, may be implemented, for example, as a bused interconnect, a switched interconnect or a hybrid interconnect. The local interconnects 201 and SMP interconnects 106 in an SMP computer together form an interconnect fabric by which address, data and control (including coherency) messages are communicated.

In the depicted embodiment, processing node 200 also includes an instance of coherence management logic 214, which implements a portion of the distributed hardware-managed snoop-based coherency signaling mechanism that maintains cache coherency within data processing system 100. (Of course, in other embodiments, a hardware-managed directory-based coherency mechanism can alternatively be implemented.) In addition, each processing node 200 includes an instance of interconnect logic 216 for selectively forwarding communications between local interconnect 201 and one or more SMP interconnects 106 coupled to interconnect logic 216. Finally, processing node 200 includes a base address register (BAR) facility 218, which is described in greater detail below.

Returning to FIG. 1, in SMP computer SMP0, data and instructions residing in system memory pools M0A and M0B can generally be accessed and modified by any processing unit 202 or other device in processing unit pools P0A and P0B, and system memory pool M0C is inaccessible (and invisible) to processing unit(s) 202 and other devices in processing unit pool P0A in processing node N0A but accessible to processing unit(s) 202 and other devices of processing unit pool P0B in processing node N0B. Similarly, in SMP computer SMP1, data and instructions residing in system memory pools M1A and M1B can generally be accessed and modified by any processing unit 202 or other device in processing unit pools P1A and P1B, and system memory pool M1C is inaccessible (and invisible) to processing unit(s) 202 and other devices in processing unit pool M1A of processing node N0A but accessible to processing unit(s) 202 and other devices in processing unit pool P1B of processing node N1B. System memory pools, such as M0C and M1C, which are not accessible to all processing unit pools of the SMP computers in which the system memory pools are disposed, are referred to herein as "restricted access memory pools."

The visibility of the various system memory pools to the processing unit pools in the same SMP computer is governed by the settings of one or more base address register (BAR) facilities 218. For example, FIG. 2 depicts an embodiment in which each processing node 200 in aggregate data processing system 100 includes a BAR facility 218 accessible to its IMC(s) 220, processing units 202, and interconnect logic 216. In a preferred embodiment, the settings of BAR facility 218, which may be established, for example, by system firmware at system startup, indicate the system memory pools (or system memory address ranges) to which an IMC 220 will permit access by particular processing unit pools (or individual processing units 202) within the SMP computer containing that IMC 220. In this embodiment, a system memory pool (and any cached version of the contents thereof) not designated by BAR facility 218 as accessible to a processing unit pool is inaccessible (and invisible) to that processing unit pool. Accordingly, any attempted access by a processing unit 202 to a system memory pool (or a cached version of the contents thereof) that is inaccessible to the processing unit pool containing that processing unit 202 results in generation of an access error by an IMC 218 and/or a processing unit 202

As further indicated in FIG. 1, data processing system 100 further includes a third "synthetic" SMP computer SMP2 formed, at a minimum, of a processing unit 202 in a processing node of one SMP computer coupled to a restricted access memory pool in a processing node of another SMP computer. In the depicted embodiment, SMP computer SMP2 includes memory pool M0C and one or more processing units 202 in processing unit pool P0B of processing node N0B in SMP computer SMP0 as well as memory pool M1C and one or more processing units 202 in processing unit pool P1B of processing node N1B in SMP computer SMP1. SMP computer SMP2 additionally includes at least one interconnect directly or indirectly coupling the processing nodes containing the restricted access memory pool and processing unit(s) comprising SMP computer SMP2. For example, in FIG. 1 processing nodes N0B and N1B are directly connected by a system interconnect 106c. In other embodiments, processing nodes N0B and N1B can be indirectly coupled via another processing node containing, at a minimum, a processing unit pool and, optionally, a system memory pool. Processing nodes, such as processing nodes N0B and MB, containing hardware processing or memory resources that belong to both a synthetic SMP computer and a physical SMP computer are referred to herein as "multi-computer processing nodes."

Those skilled in the art will appreciate that data processing system 100 can include many additional unillustrated components, such as peripheral devices, interconnect bridges, non-volatile storage, ports for connection to networks or attached devices, etc. Because such additional components are not necessary for an understanding of the present invention, they are not illustrated in FIG. 1 or discussed further herein.

With the aggregate SMP architecture exemplified by data processing system 100, at least some processing units enjoy full hardware-managed load/store coherent, ordered access to a system memory pool residing in another SMP computer. Table IA below summarizes the system memory pools in aggregate data processing system 100 to which the processing unit pools have load/store coherent, ordered access.

TABLE IA

|     | P0A | P0B | P1B | P1A |
|-----|-----|-----|-----|-----|
| M0A | Yes | Yes | No  | No  |
| M0B | Yes | Yes | No  | No  |
| M0C | No  | Yes | Yes | No  |
| M1C | No  | Yes | Yes | No  |
| M1B | No  | No  | Yes | Yes |
| M1A | No  | No  | Yes | Yes |

As indicated in Table IA, processing unit pool P0A has hardware-managed load/store coherent, ordered access to system memory pools M0A and M0B, but not system memory pool M0C or any of the system memory pools in SMP computer SMP1. Similarly, processing unit pool NA has hardware-managed load/store coherent, ordered access to system memory pools M1A and M1B, but not system memory pool M1C or any of the system memory pools in SMP computer SMP0. Processing unit pools within SMP computer SMP2 have broader memory access, with hardware-managed load/store coherent, ordered access to any memory pool in any SMP computer to which the processing unit pools belong. In particular, processing unit pool P0B has hardware-managed load/store coherent, ordered access to system memory pools M0A, M0B, M0C and M1C, and processing unit pool P1B has hardware-managed load/store coherent, ordered access to system memory pools M1A, M1B, M1C and M0C. Consequently, processes executed by processing unit pools shared by multiple SMP computers can perform all storage operations as if the multiple SMP computers were a single larger SMP computer.

The hardware-managed load/store coherent, ordered access that flows naturally from the aggregate SMP architecture described herein stands in contrast to the permutations of coherency available with other architectures, which are summarized in Table IB.

TABLE IB

|     | P0A | P0B | P1B | P1A |
|-----|-----|-----|-----|-----|
| M0A | HW  | HW  | N   | N   |
| M0B | HW  | HW  | N   | N   |
| M0C | —   | —   | —   | —   |
| M1C | —   | —   | —   | —   |
| M1B | N   | N   | HW  | SW  |
| M1A | N   | N   | SW  | HW  |

Table IB illustrates that in conventional computer systems, restricted access memory pools, such as system memory pools M0C and M1C, are not present to "bridge" hardware-managed load/store coherent memory accesses across different SMP computers. Consequently, in the prior art, hardware-managed load/store coherent, ordered memory accesses (designated in Table IB as "HW") are only possible for memory accesses within the same SMP computer system, for example, memory accesses by processing unit pools P0A and P0B to system memory pools M0A and M0B in SMP0. For memory accesses between SMP computer systems, conventional SMP systems employ software protocol stack-based mailbox communication over a network (designated in Table IB as "N" for "network"). There are, of course, other non-SMP architectures, such as certain NUMA or "cell" architectures, that employ a mixture of software ("SW") and hardware ("HW") coherency management for memory accesses within a single system. These architectures are represented in Table IB by processing unit pools P1A and P1B and system memory pools M1A and M1B.

As noted above, exhaustion of the memory namespace is a concern as SMP system scales increase. The aggregate SMP architecture exemplified by aggregate data processing system 100 can address this concern by supporting real address aliasing, meaning that at least some real memory addresses can be associated with multiple different storage locations in particular system memories without error given the memory visibility restrictions described above with reference to Table IA. Table II below summarizes the system memory pools in aggregate data processing system 100 for which real address aliasing is possible.

TABLE II

|     | M0A | M0B | M0C | M1C | M1B | M1A |
|-----|-----|-----|-----|-----|-----|-----|
| M0A | n/a | No  | No  | No  | Yes | Yes |
| M0B | No  | n/a | No  | No  | Yes | Yes |

TABLE II-continued

|     | M0A | M0B | M0C | M1C | M1B | M1A |
| --- | --- | --- | --- | --- | --- | --- |
| M0C | No  | No  | n/a | No  | No  | No  |
| M1C | No  | No  | No  | n/a | No  | No  |
| M1B | Yes | Yes | No  | No  | n/a | No  |
| M1A | Yes | Yes | No  | No  | No  | n/a |

Table II thus indicates that real addresses assigned to storage locations in system memory pool M0A and M0B can be reused for storage locations in system memory pools M1B and M1A. Similarly, real addresses assigned to storage locations in system memory pool M1A and M1B can be reused for storage locations in system memory pools M0B and M0A. Because of the visibility of restricted access memory pools, such as system memory pools M0C and M1C, across multiple SMP computers, the real memory addresses of restricted access memory pools are preferably not aliased.

Within data processing system 100, processing units 202 in processing unit pools access storage locations in system memory pools by communicating memory access transactions via the interconnect fabric. Each memory access transaction may include, for example, a request specifying a request type of access (e.g., read, write, initialize, etc.) and a target real address to be accessed, coherency messaging that permits or denies the requested access, and, if required by the request type and permitted by the coherency messaging, a data transmission, for example, between a processing unit 202 and IMC 220 or cache hierarchy 206. As will be appreciated, at any one time, a large number of such memory access transactions can be in progress within data processing system 100. In a preferred embodiment, the memory access transactions in progress at the same time are distinguished by hardware-assigned tags, which are utilized by IMCs 220 and processing units 202 to associate the various components (e.g., request, coherency messaging and data transfer) of the memory access transactions.

As indicated below by Tables III and IV, respectively, the aggregate SMP architecture exemplified by data processing system 100 additionally permits some aliasing of the hardware-assigned tags utilized by IMCs 220 and processing unit pools to distinguish the various memory access transactions. Specifically, the aggregate SMP architecture permits aliasing of hardware-assigned tags by hardware components that are architecturally guaranteed not to have common visibility to the same memory access transaction.

TABLE III

|     | M0A | M0B | M0C | M1C | M1B | M1A |
| --- | --- | --- | --- | --- | --- | --- |
| M0A | n/a | No  | No  | No  | No  | Yes |
| M0B | No  | n/a | No  | No  | No  | No  |
| M0C | No  | No  | n/a | No  | No  | No  |
| M1C | No  | No  | No  | n/a | No  | No  |
| M1B | No  | No  | No  | No  | n/a | No  |
| M1A | Yes | No  | No  | No  | No  | n/a |

TABLE IV

|     | P0A | P0B | P1B | P1A |
| --- | --- | --- | --- | --- |
| P0A | n/a | No  | No  | Yes |
| P0B | No  | n/a | No  | No  |
| P1B | No  | No  | n/a | No  |
| P1A | Yes | No  | No  | n/a |

Thus, Table III indicates that the IMCs 220 that control system memory pools M1A and M0A are permitted to alias hardware-assigned tags. Similarly, Table IV indicates that processing units 202 and other devices in processing unit pools P0A and P1A are permitted to alias hardware-assigned tags. In this manner, the effective tag name space of an aggregate SMP data processing system can be expanded.

Figure 3:
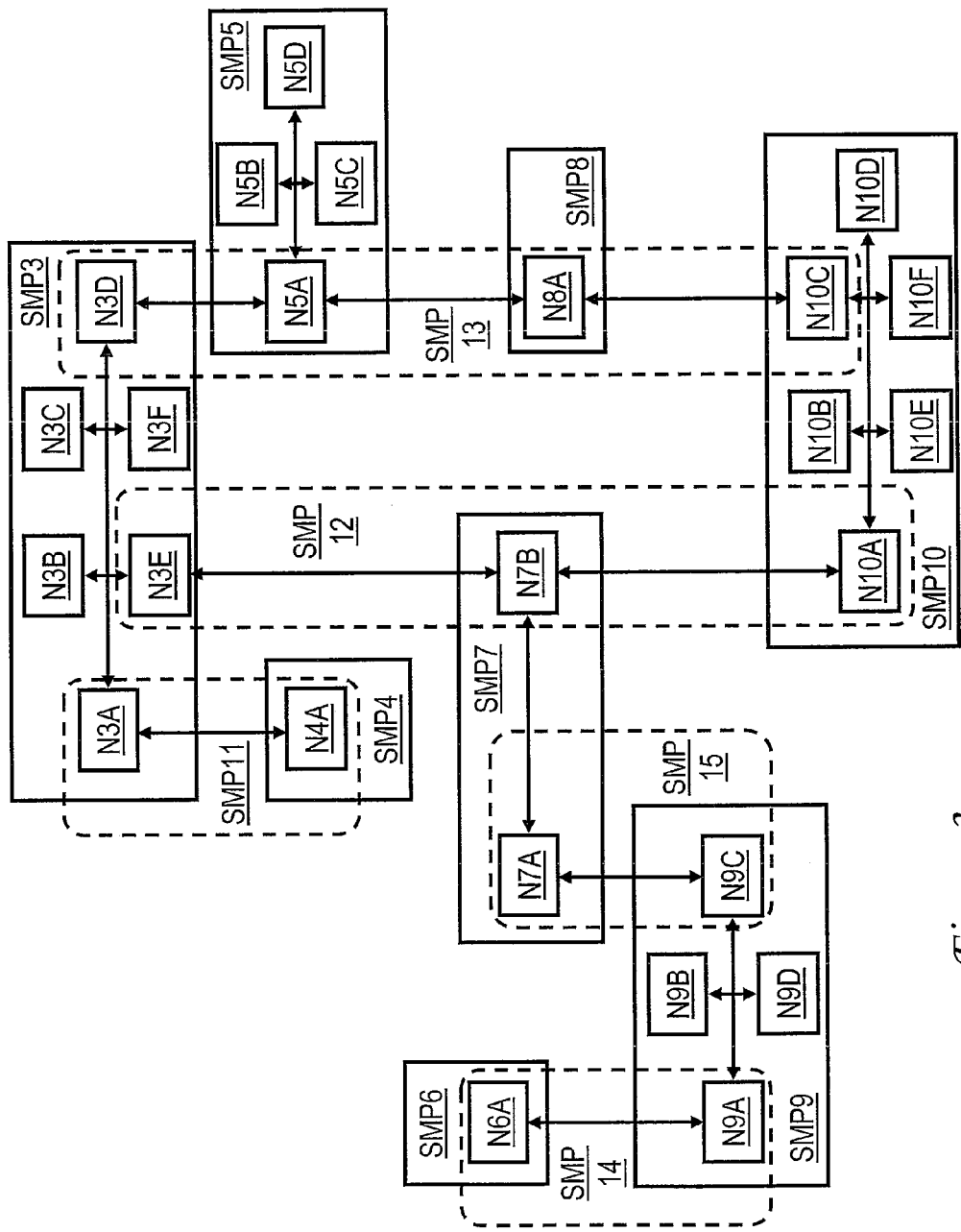
FIG. 3 is a high level block diagram of an aggregate SMP data processing system exemplifying an organic topology.

With reference now to FIG. 3, there is illustrated a high level block diagram of a second aggregate SMP data processing system 300 having an organic topology. Data processing system 300 includes eight physical SMP computers SMP3-SMP10. In the depicted embodiment, each of physical SMP computers SMP3-SMP10 includes one or more processing nodes, and if more than one processing node, an interconnect fabric coupling the processing nodes for communication as described above with reference to FIG. 1. The processing unit pools and system memory pools in each processing node are not illustrated in FIG. 3 in order to avoid unnecessarily obscuring the topology.

As described above with reference to FIG. 1, aggregate SMP data processing system 300 of FIG. 3 additionally includes synthetic SMP computers SMP11-SMP15, which are formed of hardware components shared with particular ones of physical SMP computers SMP3-SMP10. In particular, synthetic SMP computer SMP11 includes, at a minimum, a restricted access memory pool in one of processing nodes N3A and N4A and a processing unit pool in the other, with a system interconnect coupling the processing nodes for communication. Synthetic SMP computer SMP12 includes, at a minimum, a restricted access memory pool or a processing unit pool in each of processing nodes N3E, N7B and N10A, with at least one processing unit pool being located in a different physical SMP than at least one of the restricted access memory pool(s) and with system interconnects coupling all of processing nodes N3E, N7B and N10A for communication. Synthetic SMP computers SMP13-SMP15 are similarly constructed.

In data processing system 300, memory visibility and access, address aliasing, and hardware tag reuse are preferably governed in the same manner as described above with reference to Tables IA, II, III and IV, supra. In this manner, processes executed by processing unit pools shared by multiple SMP computers can perform all storage operations as if the multiple SMP computers were a single larger SMP computer.

Figure 4A:
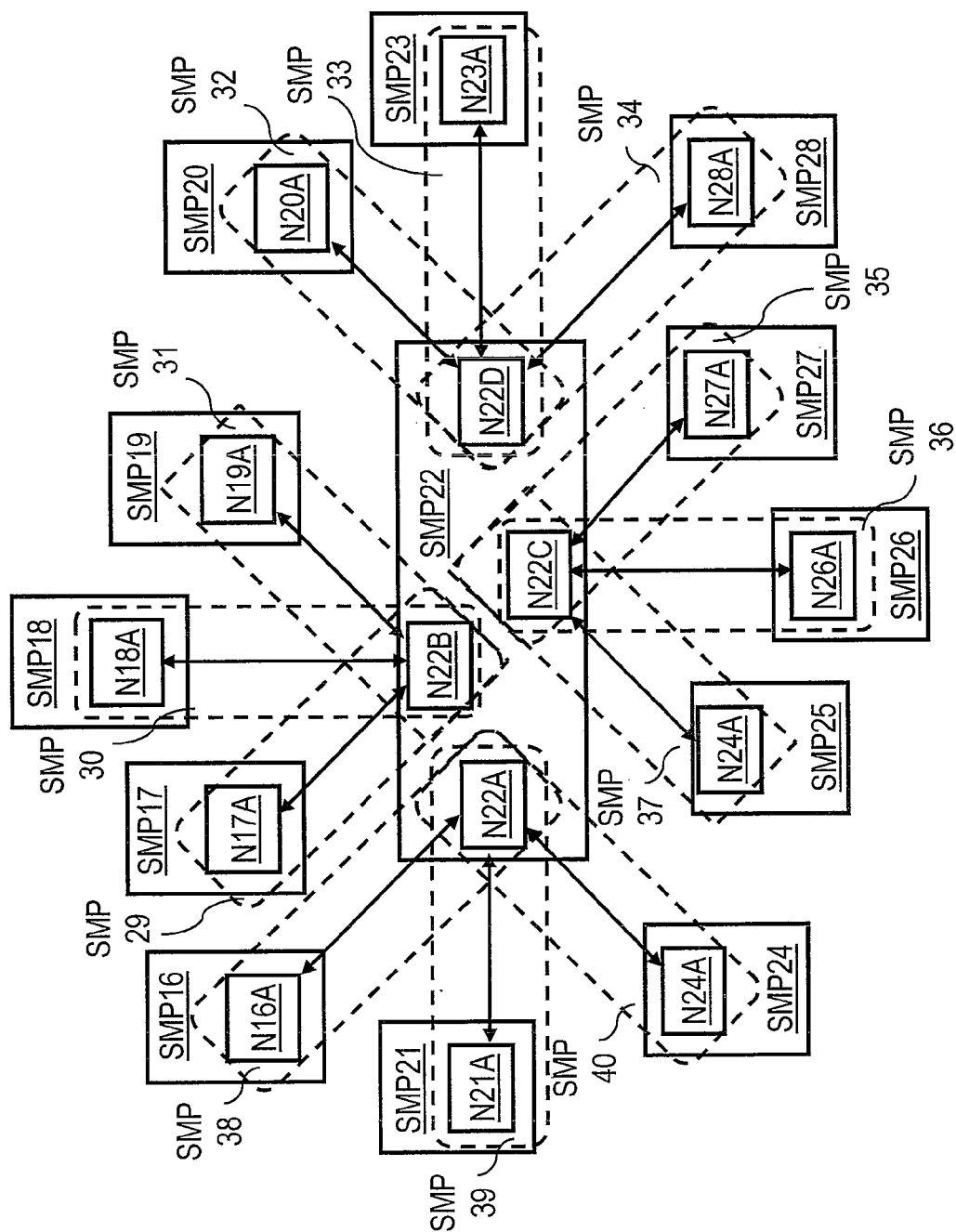
FIG. 4A is a high level block diagram of an aggregate SMP data processing system exemplifying a star topology.

FIG. 4A depicts an alternative star topology of an aggregate SMP data processing system 400. Aggregate data processing system 400 includes thirteen physical SMP computers SMP16-SMP28, which include hub SMP computer SMP22 and twelve leaf SMP computers SMP16-SMP21 and SMP23-SMP28. In the depicted embodiment, hub SMP computer SMP22 includes four processing nodes N22A-N22D, which are each coupled to processing nodes in three leaf SMP computers. For example, processing node N22A is coupled to processing node N16A of SMP computer SMP16 to form synthetic SMP computer SMP38, is coupled to processing node N21A of SMP computer SMP21 to form synthetic SMP computer SMP39, and is coupled to processing node N24A of SMP computer SMP24 to form synthetic SMP computer SMP40. The other processing nodes N22B-N22D of hub SMP computer SMP22 are similarly coupled to processing nodes of other SMP computers to form synthetic SMP computers SMP29-SMP37.

Figure 4B:
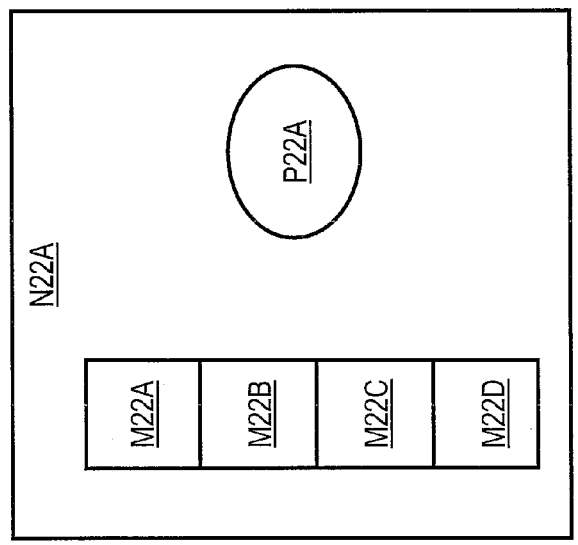
FIG. 4B is a high level block diagram of a processing node containing multiple restricted access memory pools.

As described above with reference to FIG. 1, the processing nodes in leaf SMP computers SMP16-SMP21 and SMP23-SMP28 may each include a restricted access memory pool accessible and visible to the synthetic SMP computer linking that processing node to hub SMP computer SMP22, but inaccessible and invisible to at least some processing units 202 of that processing node. Processing nodes N22A-N22D of hub SMP computer SMP22 contain multiple restricted access memory pools to support the multiple synthetic SMP computers coupled thereto. For example, FIG. 4B illustrates that processing node N22A of hub SMP computer SMP22 includes at least one processing unit pool P22A and four system memory pools M22A-M22D. Of system memory pools M22A-M22D, only system memory pool M22A is accessible and visible to the processing unit pools in all of processing nodes N22A-N22D in SMP computer SMP22. System memory pools M22B-M22D are restricted access memory pools that are each accessible and visible only to processing unit pool P22A and at least one processing unit pool in a respective one of SMP computers SMP38-SMP40. Thus, for example, restricted access memory pool M22B is accessible and visible to processing unit pool P22A and to a processing unit pool in processing node N16A, but is inaccessible and invisible to processing unit pools in processing nodes N21A and N24A.

It should be understood that the topologies exemplified by aggregate data processing systems 100, 300 and 400 represent only three of the numerous possible topologies of aggregate data processing systems. In each topology, the aggregate data processing system provides the benefit of hardware-managed load/store coherent, ordered shared memory access across multiple physical SMP computers. In addition, system extensibility is enhanced as compared to traditional SMP architectures in that coherency messaging on system interconnects does not grow geometrically with aggregate system scale, but merely with the scale of each individual SMP computer. Further, as discussed above, the aliasing of real addresses and hardware-assigned tags enabled by the aggregate data processing system architecture disclosed herein slows the exhaustion of namespaces of critical system resources. As a result, the scale of system employing the aggregate data processing system architecture disclosed herein can be unbounded.

Figure 5:
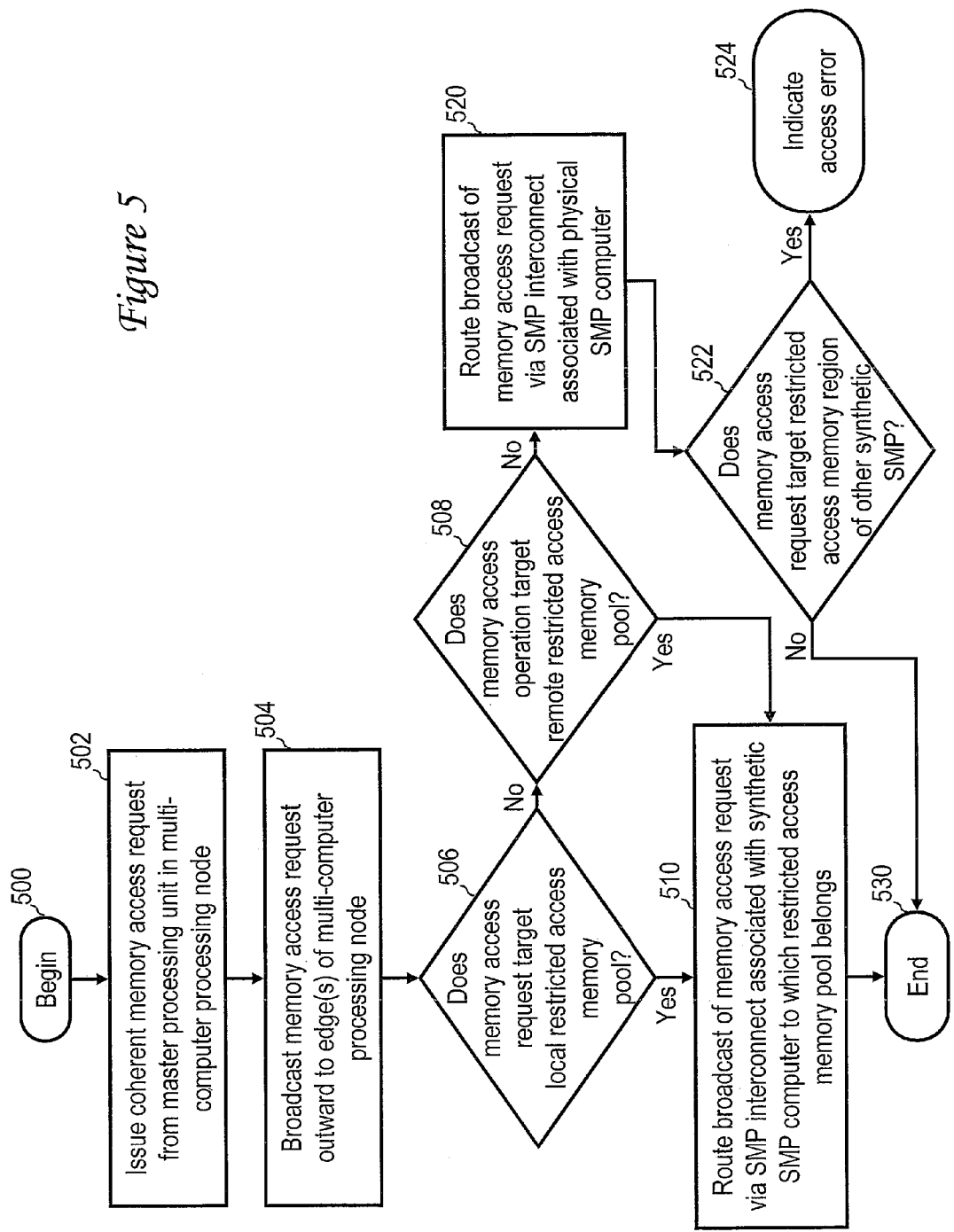
FIG. 5 is a high level logical flowchart of an exemplary method of communicating a coherent memory access operation originated by a master processing unit in a multi-computer processing node of an aggregate SMP data processing system in accordance with one embodiment.

Referring now to FIG. 5, there is illustrated a high level logical flowchart of an exemplary method of communicating a coherent memory access request originated by a master device in a multi-computer processing node of an aggregate SMP data processing system in accordance with one embodiment. The process begins a block 500 and then proceeds to block 502, which illustrates a master device (hereinafter assumed to be a master processing unit 202) in a multi-computer processing node initiating a coherent memory access operation (e.g., a read, write, initialize, etc.) on the interconnect fabric of the multi-computer processing node. As described above, the memory access operation is initiated by the master processing unit 202 first transmitting a memory access request, specifying, for example, the request type and the target real memory address to be accessed. Thus, for example, a processing unit 202 that is a member of processing unit pool P0B in processing node N0B of aggregate data processing system 100 may issue a read request on the local interconnect 201 of processing node N0B at block 502.

As indicated by block 504, the memory access request is broadcast on the local interconnect of the multi-computer processing node to all processing unit pools in the multi-computer processing node and eventually to the "edge(s)" of the multi-computer processing node, for example, the interconnect logic 216 coupled by a system interconnect 106 to at least one other processing node 200. Interconnect logic 216 at each edge of the multi-computer processing node determines at blocks 506 and 508 whether or not the memory access request targets a real address assigned to a physical storage location in a local restricted access memory pool within the multi-computer processing node or a remote restricted access memory pool in another processing node 200. For example, at block 506, interconnect logic 216 of a processing node 200 coupled to system interconnect 106c determines by reference to its BAR facility 218 whether the target real address specified by the memory access request is assigned to a physical storage location in local restricted access memory pool M0C or in remote restricted access memory pool M1C.

In response to an instance of interconnect logic 216 making an affirmative determination at either block 506 or 508 that the memory access request targets a real address in a local or remote restricted access memory pool, the instance of interconnect logic 216 routes the broadcast of the memory access request via a SMP interconnect associated with the synthetic SMP computer to which the restricted access memory pool belongs (block 510). In this embodiment, all processing nodes in the synthetic SMP computer receive the broadcast of the memory access request. In other embodiments, it will be appreciated that cache coherency states within the multi-computer processing node containing the master processing unit 202 can also be utilized to determine whether the coherency protocol requires broadcast of the memory access request to all processing nodes of the synthetic SMP computer or whether a scope or broadcast limited to fewer processing nodes (e.g., limited to the multi-computer processing node) can be employed. Additional information regarding such alternative embodiments can be found, for example, in U.S. patent application Ser. No. 11/054,820, which is incorporated herein by reference. Following block 510, the process depicted in FIG. 5 terminates at block 530.

If, however, interconnect logic 216 makes negative determinations at blocks 506 and 508, interconnect logic 216 routes the broadcast of the memory access request via the SMP interconnect to one or more other processing nodes of the physical SMP computer to which the multi-computer processing node belongs. In this embodiment, all processing nodes in the physical SMP computer receive the broadcast of the memory access request. (As noted above, a more restricted scope of broadcast can be employed in other embodiments.) Block 522 depicts IMCs 220 and processing units 202 that receive the memory access request determining by reference to BAR facility 218 whether or not the target real address specified by the memory access request falls within a restricted memory access pool of a synthetic SMP computer to which the master processing unit does not belong. In response to an affirmative determination at block 522, at least the IMC 220 that controls the system memory to which the target real address is assigned provides a response to the master processing unit indicating an access error (e.g., an Address Not Found response), as depicted at block 524. In response to a negative determination at block 522, the process depicted in FIG. 5 terminates at block 530.

Figure 6:
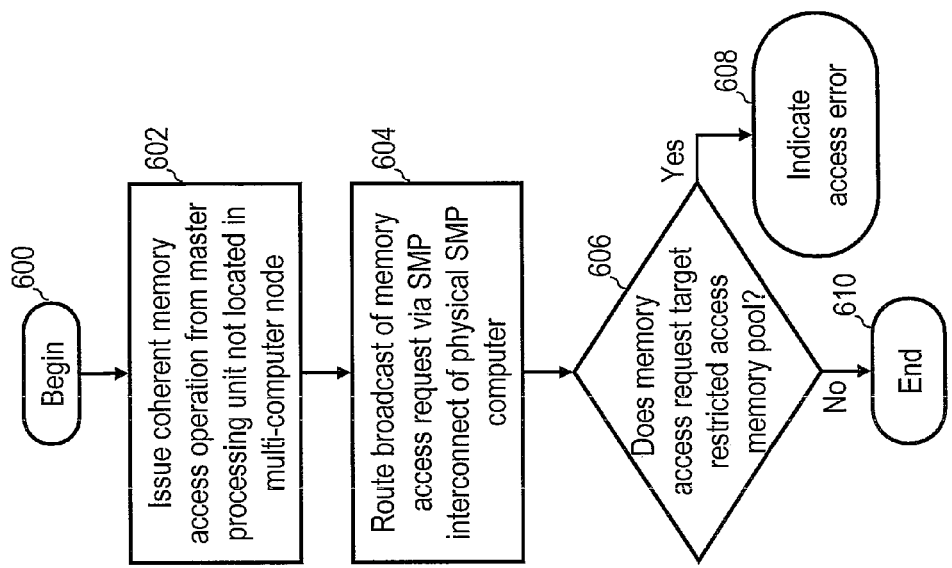
FIG. 6 is a high level logical flowchart of an exemplary method of communicating a coherent memory access operation originated by a master processing unit in a processing node that is not a multi-computer processing node of an aggregate SMP data processing system in accordance with one embodiment.

Referring now to FIG. 6, there is depicted a high level logical flowchart of an exemplary method of communicating a coherent memory access operation originated by a master device in a processing node that is not a multi-computer processing node of an aggregate SMP data processing system in accordance with one embodiment. The process begins a block 600 and then proceeds to block 602, which illustrates a master device (hereinafter assumed to be a master processing unit 202) in a processing node 200 that is not a multi-computer processing node initiating a coherent memory access operation (e.g., a read, write, initialize, etc.) on the interconnect fabric of its processing node. As described above, the memory access operation is initiated by the master processing unit 202 first transmitting a memory access request, specifying, for example, the request type and the target real memory address to be accessed. Thus, for example, a processing unit 202 that is a member of processing unit pool P0A in processing node N0A of aggregate data processing system 100 may issue a read request on the local interconnect 201 of processing node N0A at block 602.

As indicated by block 604, the memory access request is broadcast on the local interconnect 201 of the processing node 200 to all processing unit pools therein and eventually to all processing nodes of the physical SMP computer containing the master processing unit (unless a broadcast of more restricted scope is permitted by the coherency protocol). Again referring to FIG. 1, for example, the memory access request is broadcast not only to all processing units and other devices in processing unit pool P0A, but also to all processing units and other devices in processing unit pool P0B. Block 606 depicts IMCs 220 and processing units 202 that receive the memory access request determining by reference to BAR facility 218 whether or not the target real address specified by the memory access request falls within a restricted memory access pool allocated to a synthetic SMP computer (e.g., restricted access memory pool M0C of FIG. 1). In response to an affirmative determination at block 606, at least the IMC 220 that controls the system memory to which the target real address is assigned provides a response to the master processing unit indicating an access error (e.g., an Address Not Found response), as depicted at block 608. In response to a negative determination at block 606, the process depicted in FIG. 6 terminates at block 610.

Following the process shown in FIG. 5 or FIG. 6, a memory access request that does not generate an access error is received by all processing nodes 200 required to have visibility to the memory access request for coherency purposes. As each processing node 200 receives the broadcast of the memory access request, instances of coherency management logic 214 perform any coherency messaging (e.g., acknowledgment, coherency state updates, kill operations, etc.) required to ensure that the requested memory access is coherent and properly ordered for the implemented memory ordering model (e.g., strongly consistent, weakly consistent, etc.). In addition, the IMC 220 that controls the system memory to which the target real address is assigned or a cache hierarchy 206 caching data associated with the target real address may also communicate (receive or send) data with the master processing unit 202 if required to service the memory access request. In at least some embodiments, the coherency messaging and data transport may be accomplished utilizing entirely conventional SMP techniques known to those skilled in the art.

Following reads and certain other memory access operations, a copy of the target memory block may remain cached in the cache hierarchy 206 of a master processing unit 202. It should be understood that in some cases, this cached copy of the target memory block is identified by a real address assigned to a storage location in a system memory pool of a different physical SMP than the physical SMP containing the cache hierarchy 206.

As has been described, in some embodiments, an aggregate symmetric multiprocessor (SMP) data processing system includes a first SMP computer including at least first and second processing units and a first system memory pool and a second SMP computer including at least third and fourth processing units and second and third system memory pools. The second system memory pool is a restricted access memory pool inaccessible to the fourth processing unit and accessible to at least the second and third processing units, and the third system memory pool is accessible to both the third and fourth processing units. An interconnect couples the second processing unit in the first SMP computer for load-store coherent, ordered access to the second system memory pool in the second SMP computer, such that the second processing unit in the first SMP computer and the second system memory pool in the second SMP computer form a synthetic third SMP computer.

While various embodiments have been particularly shown and described, it will be understood by those skilled in the art that various changes in form and detail may be made therein without departing from the spirit and scope of the appended claims. For example, although aspects have been described with respect to a data processing system, it should be understood that present invention may alternatively be implemented as a program product including a storage medium storing program code that can be processed by a data processing system.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. An aggregate symmetric multiprocessor (SMP) data processing system, comprising:
   multiple SMP computers including a first SMP computer having at least first and second processing units and a first system memory pool, a second SMP computer having at least third and fourth processing units and a second system memory pool, and a third SMP computer having at least fifth and sixth processing units and third, fourth and fifth system memory pools, wherein:
   the third system memory pool is accessible to both the fifth and sixth processing units;
   the fourth system memory pool is a restricted access memory pool inaccessible to the third, fourth and sixth processing units and accessible to at least the second and fifth processing units;
   the fifth system memory pool is a restricted access memory pool inaccessible to the first, second and sixth processing units and accessible to at least the fourth and fifth processing units; and
   an interconnect fabric including a first interconnect coupling the second processing unit in the first SMP computer for load-store coherent, ordered access to the fourth system memory pool in the third SMP computer and a second interconnect coupling the fourth processing unit in the second SMP computer for load-store coherent, ordered access to the fifth system memory pool in the third SMP computer, wherein the second processing unit in the first SMP computer and the fourth system memory pool in the third SMP computer form a synthetic fourth SMP computer and the fourth processing unit in the second SMP computer and the fifth system memory pool in the third SMP computer form a synthetic fifth SMP computer;

wherein the first SMP computer system and the third SMP computer system employ hardware transaction tag aliasing such that a first component in the first SMP computer system and a second component in the third SMP computer system that are not within the fourth SMP computer system append a shared hardware transaction tag to memory access transactions.

2. The aggregate symmetric multiprocessor (SMP) data processing system of claim 1, wherein the first SMP computer further includes a sixth system memory pool that is a restricted access memory pool inaccessible to the first processing unit, accessible to the second processing unit by load-store coherent, ordered access, and belonging to the synthetic fourth SMP computer.

3. The aggregate symmetric multiprocessor (SMP) data processing system of claim 2, wherein:
the synthetic fourth SMP computer includes the fifth processing unit; and
the sixth system memory pool in the first SMP computer is accessible via load-store coherent, ordered access to the fifth processing unit in the third SMP computer via the interconnect fabric.

4. The aggregate symmetric multiprocessor (SMP) data processing system of claim 1, wherein the third SMP computer includes a base address register facility that controls accessibility of the fourth system memory pool by the second, third, fourth, fifth and sixth processing units.

5. The aggregate symmetric multiprocessor (SMP) data processing system of claim 4, wherein the first SMP computer includes interconnect logic that, responsive to receipt of a memory access request originating in the first SMP computer and targeting a real address assigned to the fourth system memory pool, transmits the memory access request to the third SMP computer via the interconnect by reference to the base address register facility if the memory access request was originated by the second processing unit and refrains from transmitting the memory access request to the third SMP computer by reference to the base address register facility if the memory access request was originated by the first processing unit.

6. The aggregate symmetric multiprocessor (SMP) data processing system of claim 4, wherein the third SMP computer includes a memory controller that, responsive to receipt of a memory access request originated by the sixth processing unit requesting access to the fourth or fifth system memory pools, detects an access error by reference to the base address register facility and indicates the access error.

7. The aggregate symmetric multiprocessor (SMP) data processing system of claim 1, wherein the second processing unit of the first SMP computer transmits a load-store coherent, ordered memory access request via the first interconnect to the third SMP computer, the memory access request specifying a target real address assigned to a storage location in the fourth system memory pool of the third SMP computer.

8. The aggregate symmetric multiprocessor (SMP) data processing system of claim 7, wherein the second processing unit of the first SMP computer includes a cache hierarchy that, following the memory access request, caches a memory block identified by the target real address.

9. A symmetric multiprocessor (SMP) computer apparatus for an aggregate data processing system including a first SMP computer having at least first and second processing units and a first system memory pool and a second SMP computer having at least third and fourth processing units and a second system memory pool, said SMP computer apparatus comprising:
a third SMP computer having at least fifth and sixth processing units and third, fourth and fifth system memory pools, wherein:
the third system memory pool is accessible to both the fifth and sixth processing units;
the fourth system memory pool is a restricted access memory pool inaccessible to the third, fourth and sixth processing units and accessible to at least the second and fifth processing units;
the fifth system memory pool is a restricted access memory pool inaccessible to the first, second and sixth processing units and accessible to at least the fourth and fifth processing units; and
an interconnect fabric including a first interconnect coupling the fourth system memory pool in the third SMP computer to the second processing unit in the first SMP computer for load-store coherent, ordered access by the second processing unit and a second interconnect coupling the fifth system memory pool in the third SMP computer to the fourth processing unit in the second SMP computer for load-store coherent, ordered access by the fourth processing unit, wherein the second processing unit in the first SMP computer and the fourth system memory pool in the third SMP computer form a synthetic fourth SMP computer and the fourth processing unit in the second SMP computer and the fifth system memory pool in the third SMP computer form a synthetic fifth SMP computer;
wherein the first SMP computer system and the third SMP computer system employ hardware transaction tag aliasing such that a first component in the first SMP computer system and a second component in the third SMP computer system that are not within the fourth SMP computer system append a shared hardware transaction tag to memory access transactions.

10. The symmetric multiprocessor (SMP) computer apparatus of claim 9, wherein:
the first SMP computer further includes a sixth system memory pool that is a restricted access memory pool inaccessible to the first processing unit, accessible to the second processing unit, and belonging to the synthetic fourth SMP computer;
the synthetic fourth SMP computer includes the fifth processing unit; and
the sixth system memory pool in the first SMP computer is accessible to the fifth processing unit load-store coherent, ordered access via the interconnect fabric.

11. The symmetric multiprocessor (SMP) computer apparatus of claim 9, wherein the third SMP computer includes a base address register facility that controls accessibility of the fourth system memory pool by the second, third, fourth, fifth and sixth processing units.

12. The symmetric multiprocessor (SMP) computer apparatus of claim 11, wherein the third SMP computer includes a memory controller that, responsive to receipt of a memory access request originated by the sixth processing unit requesting access to the fourth or fifth system memory pools, detects an access error by reference to the base address register facility and indicates the access error.

13. The symmetric multiprocessor (SMP) computer apparatus of claim 9, wherein the fourth system memory pool receives and services a load-store coherent, ordered memory access request from the second processing unit of the first SMP computer that specifies a target real address assigned to a storage location in the fourth system memory pool of the third SMP computer.

14. A method of data processing in an aggregate symmetric multiprocessor (SMP) data processing system including a first SMP computer having at least first and second processing units and a first system memory pool, a second SMP computer having at least third and fourth processing units and a second system memory pool, and a third SMP computer having at least fifth and sixth processing units and third, fourth and fifth system memory pools, the method comprising:

the fifth and sixth processing units accessing the third system memory pool; restricting access to the fourth system memory pool such that the fourth system memory pool is inaccessible to the third, fourth and sixth processing units and accessible to at least the second and fifth processing units;

restricting access to the fifth system memory pool such that the fifth system memory pool is inaccessible to the first, second and sixth processing units and accessible to at least the fourth and fifth processing units;

the second processing unit in the first SMP computer performing load-store coherent, ordered access to the fourth system memory pool in the third SMP computer and the fourth processing unit in the second SMP computer performing load-store coherent, ordered access to the fifth system memory pool in the third SMP computer, wherein the second processing unit in the first SMP computer and the fourth system memory pool in the third SMP computer form a synthetic fourth SMP computer and the fourth processing unit in the second SMP computer and the fifth system memory pool in the third SMP computer form a synthetic fifth SMP computer; and employing hardware transaction tag aliasing such that a first component in the first SMP computer system and a second component in the third SMP computer system that are not within the fourth SMP computer system append a shared hardware transaction tag to memory access transactions.

15. The method of claim 14, wherein:
the first SMP computer further includes a sixth system memory pool that is a restricted access memory pool belonging to the synthetic fourth SMP computer;
the method further comprises restricting access to the fourth system memory pool such that the fourth system memory pool is inaccessible to the first processing unit and accessible to the second processing unit by load-store coherent, ordered.

16. The method of claim 15, wherein:
the synthetic fourth SMP computer includes the fifth processing unit; and
the method further comprises the fifth processing unit in the third SMP computer performing load-store coherent, ordered access to the sixth system memory pool in the first SMP computer via the interconnect fabric.

17. The method of claim 14, wherein:
the third SMP computer includes a base address register facility; and
restricting access to the fourth system memory pool comprises controlling access to the fourth system memory pool by the second, third, fourth, fifth and sixth processing units by reference to the base address register facility.

18. The method of claim 17, and further comprising:
interconnect logic in the first SMP computer, responsive to receipt of a memory access request originating in the first SMP computer and targeting a real address assigned to the fourth system memory pool, transmitting the memory access request to the third SMP computer via the interconnect by reference to the base address register facility if the memory access request was originated by the second processing unit and refraining from transmitting the memory access request to the third SMP computer by reference to the base address register facility if the memory access request was originated by the first processing unit.

19. The method of claim 17, and further comprising a memory controller in the third SMP computer, responsive to receipt of a memory access request originated by the sixth processing unit requesting access to the fourth or fifth system memory pools, detecting an access error by reference to the base address register facility and indicating the access error.

20. The method of claim 14, wherein:
the second processing unit of the first SMP computer transmitting a load-store coherent, ordered memory access request via the first interconnect to the third SMP computer, the memory access request specifying a target real address assigned to a storage location in the fourth system memory pool of the third SMP computer.

21. The method of claim 20, wherein:
the second processing unit of the first SMP computer including a cache hierarchy; and
the method further comprising:
the cache hierarchy, following the memory access request, caching a memory block identified by the target real address.

22. A program product, comprising:
a non-transitory tangible computer readable storage medium;
and program code stored within the computer readable storage medium that, when processed by a data processing system, causes the data processing system to simulate operation of an aggregate symmetric multiprocessor (SMP) data processing system including an aggregate symmetric multiprocessor (SMP) data processing system including a first SMP computer having at least first and second processing units and a first system memory pool, a second SMP computer having at least third and fourth processing units and a second system memory pool, and a third SMP computer having at least fifth and sixth processing units and third, fourth and fifth system memory pools, wherein simulating operation of the aggregate SMP data processing system includes:
the fifth and sixth processing units accessing the third system memory pool;
restricting access to the fourth system memory pool such that the fourth system memory pool is inaccessible to the third, fourth and sixth processing units and accessible to at least the second and fifth processing units;
restricting access to the fifth system memory pool such that the fifth system memory pool is inaccessible to the first, second and sixth processing units and accessible to at least the fourth and fifth processing units;
the second processing unit in the first SMP computer performing load-store coherent, ordered access to the fourth system memory pool in the third SMP computer and the fourth processing unit in the second SMP computer performing load-store coherent, ordered access to the fifth system memory pool in the third SMP computer, wherein the second processing unit in the first SMP computer and the fourth system memory pool in the third SMP computer form a synthetic fourth SMP computer and the fourth processing unit in the second SMP computer and the fifth system memory pool in the third SMP computer form a synthetic fifth SMP computer, and employing hardware transaction tag aliasing such that a first component in the first SMP computer system and a second component in the third SMP computer system that are not within the fourth SMP computer system append a shared hardware transaction tag to memory access transactions.

23. The aggregate symmetric multiprocessor (SMP) data processing system of claim 1, wherein:

the first SMP computer includes at least a first processing node and the second SMP computer includes at least a second processing node including the fourth processing unit and second system memory pool;

the first interconnect is an internode interconnect; and the interconnect fabric includes an intranode interconnect in the second node coupling the fourth processing unit and the second system memory pool.

24. The SMP computer apparatus of claim 9, wherein:

the first SMP computer includes at least a first processing node and the second SMP computer includes at least a second processing node including the fourth processing unit and second system memory pool;

the first interconnect is an internode interconnect; and the interconnect fabric includes an intranode interconnect in the second node coupling the fourth processing unit and the second system memory pool.

25. The method of claim 14, wherein:

the first SMP computer includes at least a first processing node and the second SMP computer includes at least a second processing node including the fourth processing unit and second system memory pool;

an internode interconnect couples the first and second nodes for communication;

the interconnect fabric includes an intranode interconnect in the second node coupling the fourth processing unit and the second system memory pool; and the method further comprises communicating memory accesses in the second node on the intranode interconnect.

26. The program product of claim 22, wherein:

the first SMP computer includes at least a first processing node and the second SMP computer includes at least a second processing node including the fourth processing unit and second system memory pool;

an internode interconnect couples the first and second nodes for communication;

the interconnect fabric includes an intranode interconnect in the second node coupling the fourth processing unit and the second system memory pool; and the simulating operation further comprises communicating memory accesses in the second node on the intranode interconnect.

* * * * *